Figure 1:
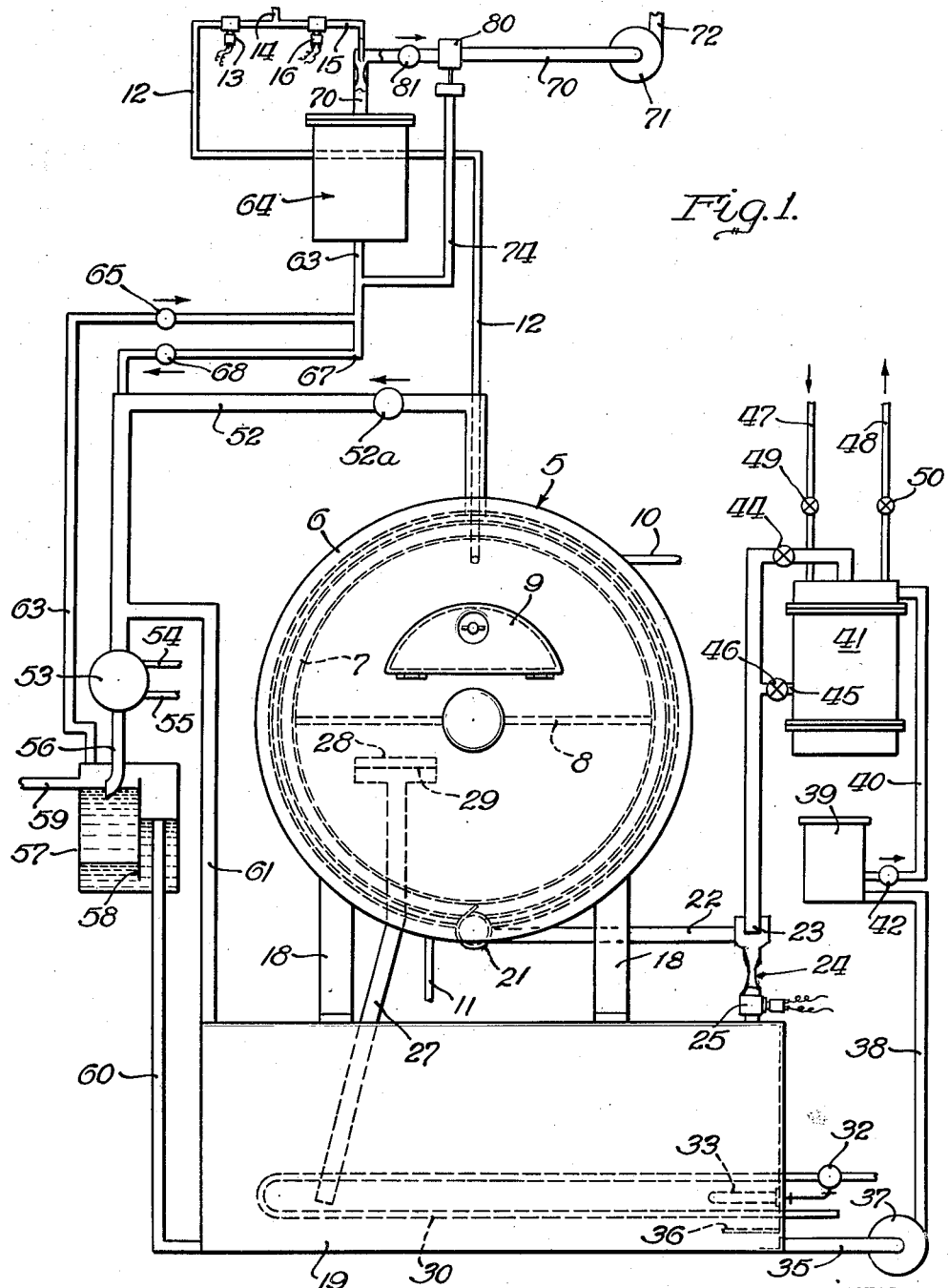

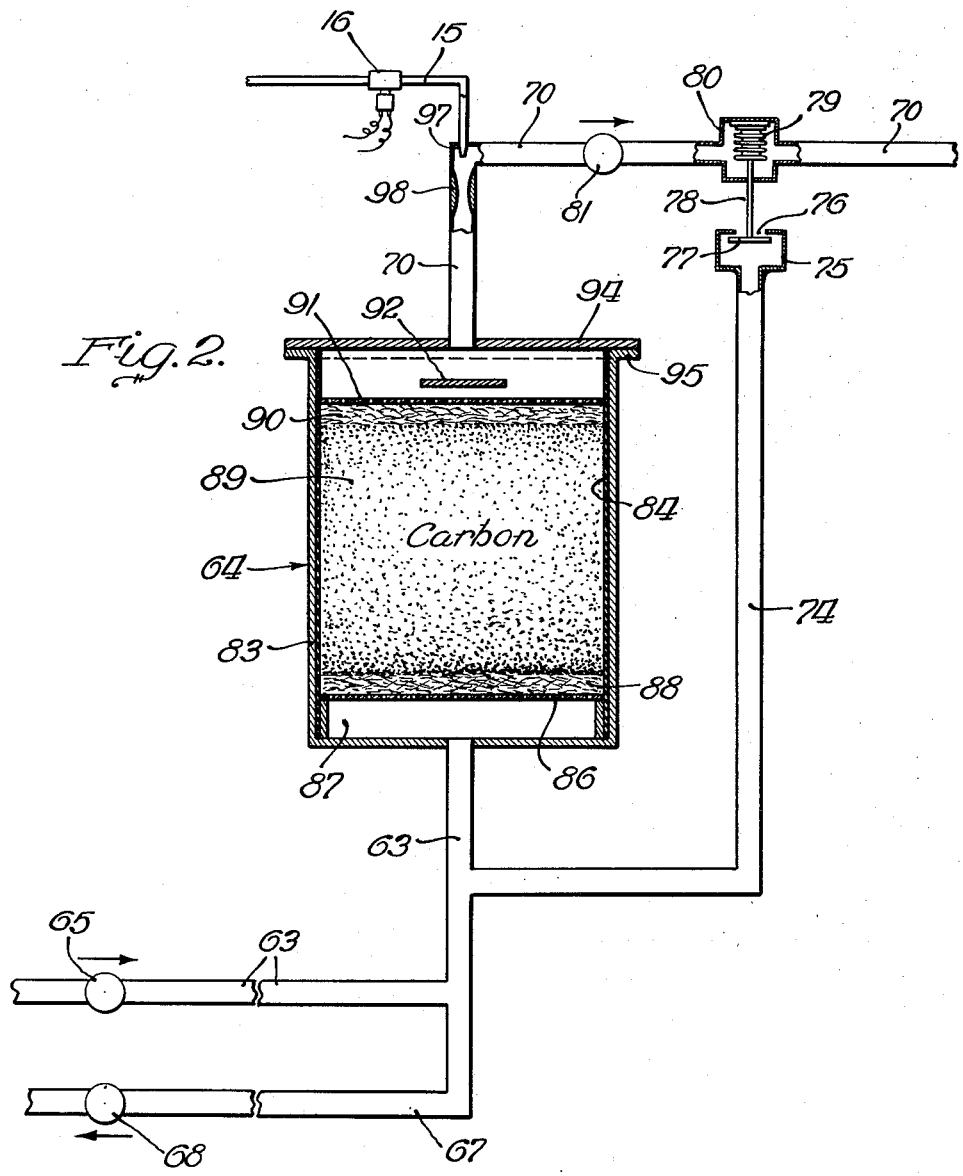

United States Patent Office 2,777,534
Patented Jan. 15, 1957

2,777,534

CARBON ADSORBER COOLING MEANS

Dan McDonald, Aurora, Ill.

Application November 23, 1951, Serial No. 257,915

3 Claims. (Cl. 183—4.1)

This invention relates to means for maintaining at high operating efficiency carbon adsorbers used in systems utilizing solvents recoverable by adsorption with activated carbon and of a character to form azeotropes with water.

It is known, in industrial operations employing solvents, to use carbon adsorbers for removing solvents from air or gases discharged to the atmosphere. That is necessary in certain cases to protect the public against the harmful effects of the solvents, the vapors or fumes of which are noxious. Also, certain of the solvents used are comparatively expensive, and discharge thereof to atmosphere in considerable amounts would render their use prohibitive. In general, the carbon adsorbers used in industrial operations are quite large and expensive, and occupy considerable space, adding materially to the expense of the apparatuses or systems incorporating them. That is particularly true in cases where the solvent used is heated to appreciable extent. In such cases the carbon of the adsorber soon becomes heated to a temperature substantially above the boiling point of the solvent, which greatly reduces the adsorptive capacity of the adsorber. In order to compensate for this substantial lowering in efficiency, occurring within a short time after it is put in use, the adsorber has to be of large size so that it can handle the requisite volume of solvent vapors at such reduced capacity or has to be provided with expensive cooling means comprising coils and accessories.

My invention is directed to a carbon adsorber which avoids the above noted objections to the carbon adsorbers presently used. I have discovered that by adequately cooling the carbon of a carbon adsorber, it may be maintained at maximum operating capacity, with no appreciable loss in efficiency throughout its period of use. Accordingly, the carbon adsorber of my invention may be of comparatively small size, with a corresponding saving in expense and space. I effect cooling of the adsorber by passing therethrough, intermittently and as required, a cooling gas, conveniently and preferably air. The inlet of the adsorber is connected to a source of solvent vapor and suitable means is provided for delivering solvent vapor from such source to the adsorber and into contact with the carbon therein. The solvent vapors give up their latent heat which, with the heat of adsorption, heats the carbon of the adsorber and, in the absence of adequate cooling means, would soon raise its temperature to such an extent as materially to reduce the efficiency of the adsorber. I avoid that difficulty by cooling the carbon of the adsorber when it approaches a temperature such as would reduce the efficiency of the adsorber. To that end, I provide means whereby cooling of the carbon is effected responsive to a predetermined high temperature thereof. For that purpose, I provide thermo-responsive valve means for admitting cooling air to the adsorber, such valve means normally being closed and comprising a thermostat exposed to the gases taken off from the adsorber and effective, at a predetermined high temperature of such gases, for opening the valve means and admitting cooling air to the adsorber. Since the temperature of the gases taken off from the adsorber corresponds to the temperature of the carbon in the adsorber, the admission of cooling air is responsive to a predetermined high temperature of the carbon. Briefly, the method, which is an important part of my invention, comprises the cooling of the carbon of the adsorber, as required, responsive to a predetermined high temperature of the carbon, conveniently and preferably by the admission of cooling air to the adsorber. The adsorber and the method of my invention are well suited for use in a dry cleaning system or apparatus using a hot chlorinated hydrocarbon solvent, and will be so shown and described, by way of example, it being understood, however, that my invention has many other industrial applications. Further objects and advantages of my invention will appear from the detail description.

In the drawings:

Figure 1 is a semi-diagrammatic view, partly in section and partly in elevation, of a dry cleaning apparatus or system embodying the carbon adsorber and the associated cooling means therefor of my invention; and Figure 2 is a sectional view, on an enlarged scale, of the carbon adsorber and the inlet and outlet conduits and the air admission conduit and its control valve, and associated parts, certain parts being shown in elevation.

The dry cleaning apparatus comprises a washer 5 having a housing 6 within which is rotatably mounted a perforated drum or basket 7 divided by a diametrical partition 8 into two compartments. The housing 6 is provided with an opening, normally closed by a door 9 mounted and secured in a suitable known manner. The drum 7 is provided with an opening (not shown) for each compartment, normally closed by a suitably mounted and secured door, for introduction and removal of clothes or analogous articles to be dry cleaned. Preferably, the housing 6 is steam jacketed, and steam is supplied to the jacket thereof by suitably disposed pipes, one of which is shown at 10, the condensate being taken off through suitably disposed pipes, one of which is shown at 11. Steam, for deodorizing the washed articles, is admitted to housing 6, at the back thereof, through a pipe 12 controlled by a normally closed solenoid operated valve 13. Pipe 12 is connected to a steam supply pipe 14 from which extends a second steam pipe 15, controlled by a normally closed solenoid operated valve 16, for a purpose to be explained more fully later. The housing 6 is stationary, and suitable known means (not shown) is provided for rotating drum 7 at a low speed, for washing, and at relatively high speed, for centrifuging, as will appear later. The washer 5 is not of the essence of my instant invention and may be of any suitable type, or any other suitable apparatus may be substituted therefor.

The washer 5 is mounted by brackets 18 on a suitable support, conveniently a solvent storage tank 19. The solvent used may be any one of several chlorinated hydrocarbons of a character to form an azeotrope with water, preferably either perchloroethylene or carbon tetrachloride. It will be assumed for purposes of description, that carbon tetrachloride is used. It has a greater specific gravity than water and a boiling point of 170°, and its azeotrope with water has a boiling point of about 150° F.

The housing 6 of washer 5 is provided, at the bottom thereof, with an upwardly opening discharge manifold 21. A drain and refill conduit 22 connects manifold 21 to a conduit 23 opening at its lower end into storage tank 19, at the top and adjacent one end thereof. The conduit 22 opens into the conduit 23 at the suction of a venturi 24 in the latter conduit a short distance above tank 19. The conduit 23 is controlled by a solenoid valve 25, of suitable known type, disposed therein between venturi 24 and tank 19. The housing 6 of washer 5 is further provided with an overflow conduit 27 opening into tank 19 a short distance above the bottom thereof, the upper end of conduit 27 opening into housing 6 through a slot 28 in the back wall thereof, defined in part by a baffle 29 formed as an element of the back wall of the housing. During the washing operation hot solvent is continuously supplied to the housing 6, through conduit 22, as will appear more fully presently, and solvent is discharged through the overflow conduit 27, whereby the desired solvent level is maintained within the washer. The solvent within tank 19 is maintained at a temperature above its boiling point with water, about 152° F., in the case of carbon tetrachloride. A heating coil 30 is disposed within the lower portion of tank 19 and receives steam at appropriate pressure under control of a thermally responsive valve 32. The valve 32 shown is of known type and is connected to a bulb 33 disposed within the lower portion of tank 19 and containing a thermo-sensitive fluid, but any suitable valve may be used. A conduit 35 opens into tank 19 adjacent the bottom thereof, beneath a baffle 36, and is connected to the intake of a continuously operating pump 37. The discharge of pump 37 is connected by a conduit 38 to a filter powder box or container 39 the outlet of which is connected by a conduit 40 to the inlet of a filter 41. The conduit 40 is controlled by a check valve 42 of known type opening toward filter 41 and closing toward container 39, to guard against back flow of solvent from the filter. The filter 41 may be of any suitable known type and the outlet thereof is connected by conduit 23 to tank 19, this conduit conveniently being provided with a normally open manually operated valve 44 of suitable known type disposed adjacent filter 41. The filter 41 is also provided with a drain nipple 45 opening into conduit 23 and normally closed by a manually operated valve 46 of suitable known type. Steam inlet and vapor outlet pipes 47 and 48, respectively, controlled by normally closed manually operated valves 49 and 50, of suitable known type, open into the filter 41. When it is desired to open the filter 41, for inspection, replacement or repairs, the major portion of the solvent therein is drained therefrom by opening the valve 46, after which that valve is closed, valve 44 being also then closed. Steam is then admitted to the filter 41 through pipe 47 and the resultant azeotropic solvent vapor is discharged through the pipe 48, or it may be drawn off through nipple 45, valve 46 and conduit 23, so as to draw the heavier vapor from the lower portion of filter 41. After the filter has been adequately steamed so as to assure removal of solvent therefrom, the valves 49 and 50 are closed and the filter may then be opened without escape to atmosphere of solvent vapors. It will be understood, of course, that pump 37 is stopped during the operation of draining and steaming the filter 41, and remains stopped until completion of that operation and reclosing of the filter.

Normally valves 46, 49 and 50 are closed and the valve 44 is open. During the washing operation the solenoid valve 25 is closed so that hot filtered solvent is continuously delivered from the filter 41 through conduit 22 to the washer 5. Upon completion of the washing operation, the solenoid valve 25 is opened and the solvent is then returned from filter 41 to the tank 19. The flow of solvent through the venturi 24 induces solvent through the conduit 22, thereby accelerating drainage of solvent from the washer. When the free solvent has been drained from the washer, the basket or drum 7 is rotated at relatively high speed, from three hundred to four hundred R. P. M. so as to remove solvent from the clothes or other articles under treatment by centrifugal force, the extracted solvent being discharged through the manifold 21 and conduit 22, assisted by the inductive effect of the solvent flowing through the venturi 24. Upon completion of the centrifuging step, the basket 7 is rotated at relatively low speed, about twenty-six R. P. M., and steam is admitted to the housing 6, through pipe 12, for removing all traces of solvent therefrom and deodorizing the articles under treatment. That is accomplished by opening the solenoid valve 13.

At the start of the washing operation all air is withdrawn from the washer through a conduit 52 opening into housing 6 at the top thereof. The conduit 52 is provided with a check valve 52a closing toward and opening away from the washer 5. This removal of air from the washer is quickly accomplished and the washer thereafter remains filled with solvent vapors, avoiding risk of oxidizing spots on the garments, such as might occur if air were present in the washer. The conduit 52 is connected to the inlet of a condenser 53 of suitable known type, conveniently cooled by water circulated through pipes 54 and 55. The outlet of condenser 53 is connected by a short conduit 56 to a gravity water separator 57 of known type having an interior baffle 58 terminating a short distance from the top and the bottom thereof. The water is continuously discharged from the separator 57 through a pipe 59 which, in practice, is provided with a U trap, it being noted that the opening at the lower end of conduit 56 extends above the water level in separator 57. The solvent from separator 57 is returned to tank 19 through a conduit 60. A conduit 61 connects the top of tank 19 to conduit 52 for taking off from tank 19 azeotropic vapors evolved therein, such vapors, with the vapors withdrawn through the conduit 52 from the washer, passing through the condenser 53 and the condensate being delivered to the separator 57, as will be clear.

A take-off conduit 63 connects the separator 57, at the top thereof to the inlet of a carbon adsorber 64. The conduit 63 is controlled by a check valve, of suitable known type, therein, designated 65, opening toward carbon adsorber 64 and closing toward separator 57. A conduit 67 connects the conduit 63, between carbon adsorber 64 and check valve 65, to the conduit 52. This conduit 67 is provided with a check valve 68 therein, between the conduits 63 and 52, opening toward conduit 52 and closing toward the adsorber 64. A conduit 70 connects the outlet of carbon adsorber 64 to the intake of a continuously operating blower 71 from which a discharge conduit 72 leads to atmosphere. It will be seen, from what has been said, that the inlet of carbon adsorber 64 is connected, through conduit 63, separator 57, conduit 56 and condenser 53 to the conduit 52 so as to maintain subatmospheric pressure within the washer and assist in withdrawing the azeotropic vapors therefrom.

An air admission conduit 74 opens at one end into the conduit 63 adjacent the inlet of the carbon adsorber 64. The conduit 74 is provided at its upper end with a valve chamber 75, shown more clearly in Figure 2, having an air inlet opening 76 controlled by a valve 77. This valve 77 is provided with a stem 78 attached to the lower movable lead of a thermostat bellows 79, of suitable known type, mounted in an enlargement or housing 80 of the conduit 70, there being a check valve 81, of suitable known type, in conduit 70. This check valve 81 opens toward the blower 71 and closes toward the adsorber, as indicated. The thermostat bellows 79 is exposed to non-adsorbed vapors and gases withdrawn through the conduit 70 from the carbon adsorber 64 and is effective for moving the valve 77 in opening and closing directions responsive to variations in the temperature of such gases. The temperature of the gases withdrawn from the adsorber 64 varies in accordance with variations in the temperature of the carbon within the adsorber 64, as will be explained more fully presently, so that the opening and closing movements of the valve 77 correspond to variations of the temperature of the carbon within the adsorber.

The carbon adsorber comprises a cylindrical container 83, preferably formed of stainless steel, provided with a lining 84 of asbestos or other suitable material effective for preventing direct contact of the carbon with the inner surface of container 83. That is desirable since, under certain conditions, there is tendency to corrosion of the metal when in direct contact with the carbon wetted by solvent adsorbed thereon. A lower perforated disc 86 is supported within container 83, adjacent the bottom thereof, by a collar or ring 87, preferably also of stainless steel. A layer or mat 88 of fibre glass rests upon disc 86 and supports a body of carbon 89, usually in the form of pellets. A layer of fibre glass 90 rests upon the upper end of the body or column of carbon 89 and is held down by a perforated disc 91, also of stainless steel, resting thereon. A baffle 92 extends across container 83 a short distance below the lower end of conduit 70, which opens centrally through a removable cover 94 bolted or otherwise suitably secured to flange 95 at the top of container 83. The steam pipe 15 is provided with a nozzle 97 extending into conduit 70 and disposed coaxially with a venturi 98 therein a short distance above the carbon adsorber 64. The check valve 81 is located between housing 80 and venturi 98, as shown. When it is desired to regenerate the carbon adsorber 64, the solenoid valve 16 is opened so that a steam jet is ejected through the venturi 98. The inductive effect of this steam jet maintains the check valve 81 closed and the steam flows into the adsorber 64, the baffle 92 serving to disperse the entering steam. The flow of steam downward through the body or column 89 of carbon removes therefrom the adsorbed solvent. A portion of the steam gives up its latent heat and condenses on the carbon, thereby furnishing the neccesary heat to vaporize the solvent adsorbed by the carbon. The remainder of the steam combines with the solvent forming azeotropic vapor which passes through conduits 63, 67 and 52 to the condenser 53 from which the condensate is delivered to the separator 57.

When the carbon has thus been regenerated the solenoid valve 16 is closed. The blower 71 then exerts suction on check valve 81 opening it and the blower resumes drawing solvent vapor into the adsorber and non-adsorbable gases and vapors from the adsorber, which at this time is too highly heated for efficient adsorption. The exhaust from the adsorber will have a high enough temperature to cause the bellows 80 to open valve 77, thus causing air to be drawn into the adsorber through pipes 74 and 63 which will cool the carbon as the water condensed thereon during regeneration is evaporated and exhausted from the adsorber. When the carbon is adequately cooled and dried the vapors exhausted therefrom being cooler will act on bellows 80 to throttle down or close valve 77.

During the washing and deodorizing steps, hot azeotropic vapor passes through the carbon adsorber 64, in which the solvent is trapped. The carbon in the adsorber effectively adsorbs the solvent in the vapor, which heats the carbon 89 and would soon raise it to such a temperature as to reduce substantially the adsorptive capacity of the adsorber 64, unless that were guarded against. When the carbon 89 within the adsorber 64 reaches a temperature such as to tend to reduce the efficiency of the adsorber, the thermostat bellows 79 expands thereby opening the valve 77 and admitting cooling air through the conduit 74 to the inlet of the adsorber. This cooling air flows through and about the carbon so as to evaporate the water on the carbon and thereby remove moisture therefrom. The water thus evaporated gets its latent heat of vaporization from the carbon and the air flowing over the carbon, so that the cooling effect is quite substantial and the temperature of the carbon is quickly lowered to restore the efficiency of the adsorber 64. When the carbon has thus been cooled, the thermostat bellows 79 contracts, due to the lower temperature of the gases then flowing thereover, thus closing the valve 77. When the temperature of the carbon in the adsorber again increases to an objectionable extent, the operation is repeated. Preferably, the bellows thermostat 79 selected is such that the temperature of the carbon 89 within the adsorber 64 is kept within a range of not more than 10° F. above the boiling point of the solvent. Assuming that the solvent used is carbon tetrachloride, the bellows thermostat 79 is so selected that the temperature of the carbon of the adsorber will not at any time exceed 180° F. and preferably should stay below approximately 170° F. For most efficient operation, when using carbon tetrachloride, the bellows thermostat 79 is so selected that the temperature of the carbon of the adsorber is maintained within a range of from approximately 160° F. to 170° F., which I have found to be the upper temperature limit for the most efficient operation of the carbon adsorber. If the solvent used is perchlorethylene, or some solvent other than carbon tetrachloride, the bellows thermostat 79 should be so selected that the most efficient operating temperature range of the carbon in the adsorber will be maintained for the particular solvent used. In referring to the temperature of the carbon in the adsorber, I mean the average or mean temperature, since there is some variation in the temperature of the carbon within the adsorber at different heights therein.

While I preferably provide the blower 71 for causing flow of vapors and gases to and through the carbon adsorber 64 and about the bellows thermostat 79, any suitable means may be provided for that purpose, within the broader aspects of my invention. The carbon adsorber and cooling means of my invention is particularly well suited, in certain of its aspects, for use with dry cleaning apparatus in which the solvent, in the presence of water usually contained in the fabrics, is heated to the boiling point of its azeotrope, and I have described it as so used, by way of example only. But it is not essential to my invention that water be present with the solvent, and any suitable solvent without water may be be used, having a boiling point non-injurious to the articles or materials under treatment, in which case the solvent may be heated to its boiling point, instead of the boiling point of its azetrope, and the evolved solvent vapor taken off from the treating vessel or container in the manner above described. In its broader aspects, the adsorber and cooling means of my invention may be used with any suitable apparatus in which solvent of a character to be adsorbed by activated carbon is vaporized and the evolved solvent vapor is taken off from the treating vessel or container.

It will be understood that changes in detail may be resorted to as to the apparatus of my invention, and I intend to include all such variations, as fall within the appended claims, in this application in which the preferred form only of my invention has been disclosed.

I claim:

1. In a system for adsorbing and recovering a solvent vapor adsorbable by activated carbon, a carbon adsorber having a solvent vapor inlet and an outlet, means for causing flow of solvent vapor and non-adsorbable gaseous fluids into said adsorber from said inlet and said fluids to said outlet, a solvent vapor conduit connected to said inlet, a take-off conduit connected to said outlet for exhausting said fluids therefrom, means imposing suction on the take-off conduit and thereby on the vapor inlet conduit, an air admission conduit connected to said solvent vapor conduit and having an inlet port operable to the atmosphere, a normally closed valve controlling said port, and a thermostat in said take-off conduit exposed to fluids flowing therethrough and having operating connection to said valve effective for opening it responsive to a predetermined high temperature of said fluids.

2. In a system for adsorbing and recovering a solvent vapor adsorbable by activated carbon, a carbon adsorber having a solvent vapor inlet and an outlet, means for causing flow of solvent vapor and non-adsorbable gaseous fluids into said adsorber from said inlet and the fluids to said outlet thereof, a solvent vapor conduit connected to said inlet, a take-off conduit connected to said outlet, an air admission conduit connected to said solvent vapor conduit, a normally closed valve controlling said air admission conduit, a thermostat in said take-off conduit exposed to said fluids flowing therethrough and having operating connection to said valve effective for opening it responsive to a predetermined high temperature of said fluids, and means for passing steam through and thereby regenerating said adsorber while maintaining said take-off conduit closed in advance of said thermostat.

3. In a system for adsorbing and recovering solvent vapor adsorbable by activated carbon, a carbon adsorber having a solvent vapor inlet and an outlet, means for causing flow of solvent vapor and non-adsorbable gases into said adsorber from said inlet toward said outlet thereof, a solvent vapor conduit connected to said inlet, a take-off conduit connected to said outlet, an air admission conduit connected to said solvent vapor conduit, a normally closed valve controlling flow of atmospheric air into said air admission conduit, and a thermostat subject to the temperature of any non-adsorbed gases flowing through said take-off conduit and having operating connection to said valve effective for opening it responsive to a predetermined high temperature of said gases.

References Cited in the file of this patent

UNITED STATES PATENTS

| | | |
|---|---|---|
| 1,547,924 | Kerschbaum | July 28, 1925 |
| 1,934,075 | Lewis | Nov. 7, 1933 |
| 1,945,441 | Miller | Jan. 30, 1934 |
| 2,083,732 | Moore et al. | June 15, 1937 |
| 2,173,405 | Whitely | Sept. 19, 1939 |
| 2,330,767 | Welty | Sept. 28, 1943 |
| 2,388,134 | Flosdorf | Oct. 30, 1945 |
| 2,390,490 | Atwell | Dec. 11, 1945 |
| 2,535,902 | Dailey | Dec. 26, 1950 |
| 2,561,441 | Lou | July 24, 1951 |
| 2,573,966 | Hamlin | Nov. 6, 1951 |
| 2,593,132 | Gannon | Apr. 15, 1952 |
| 2,633,931 | Schneider | Apr. 7, 1953 |